United States Patent [19]

Threadgill

[11] 4,059,830

[45] Nov. 22, 1977

[54] SLEEP ALARM DEVICE

[76] Inventor: Murray H. Threadgill, 33372 Palo Alto St., Dana Point, Calif. 92629

[21] Appl. No.: 627,557

[22] Filed: Oct. 31, 1975

[51] Int. Cl.² ............................................. G08B 21/00
[52] U.S. Cl. ........................................ 340/279; 180/99; 200/DIG. 2
[58] Field of Search .................. 340/279; 200/DIG. 2; 180/99

[56] References Cited

U.S. PATENT DOCUMENTS

| 1,402,609 | 1/1922 | Hodous | 200/DIG. 2 |
|---|---|---|---|
| 1,915,721 | 6/1933 | Diaz | 200/DIG. 2 |
| 2,267,489 | 12/1941 | Brockhurst | 200/DIG. 2 |
| 3,049,188 | 8/1962 | Giannetti | 180/99 |

FOREIGN PATENT DOCUMENTS 1,193,583  5/1965  Germany .................... 200/DIG. 2

Primary Examiner—Glen R. Swann, III
Attorney, Agent, or Firm—Reed C. Lawlor

[57] ABSTRACT

In at least one embodiment, a sleep inhibiting device comprises a plurality of ring-like, metallic contacting devices worn on adjacent fingers of a human hand. The contacting devices close an electrical circuit when brought into mutual contact as a result of the adjacent fingers being brought into a contiguous relationship. The sleep inhibiting device may also comprise means for physically attracting the ring-like devices to each other, thereby requiring a wearer to consciously apply a countering force to prevent physical contact of the ring-like devices. Upon inadvertent relaxation of the muscles of the hand and fingers of a wearer, the ring-like devices are brought into contact with each other and thereby close a circuit that activates a stimulation means, such as a buzzer, and thereby awakens the wearer. In one embodiment of this invention, the ring-like devices are magnetized and oppositely poled to increase the likelihood of contact upon relaxation of the muscles of the fingers and hand. In a second embodiment, electrically contacting devices extend along the exterior surface of the finger portions of a glove that is worn by the wearer.

16 Claims, 10 Drawing Figures

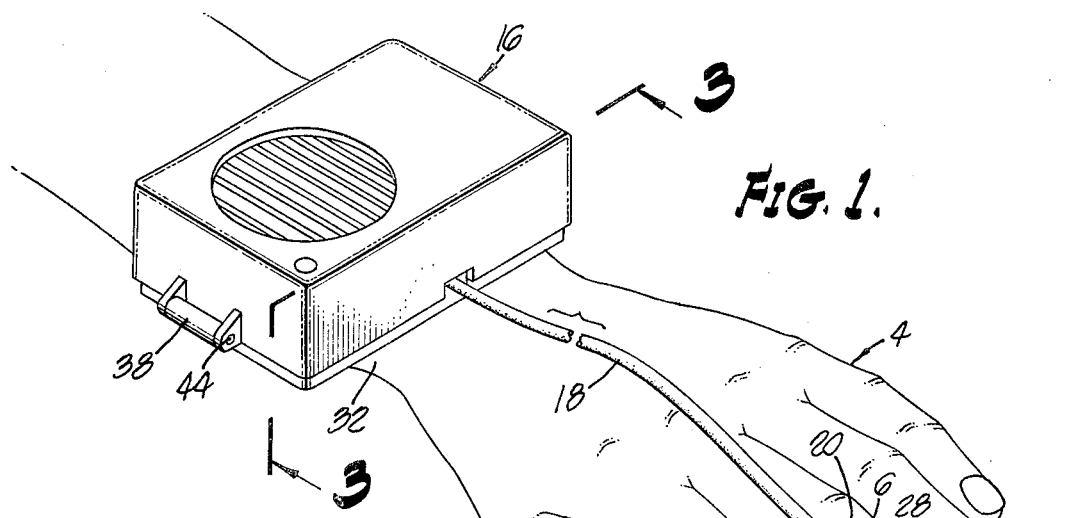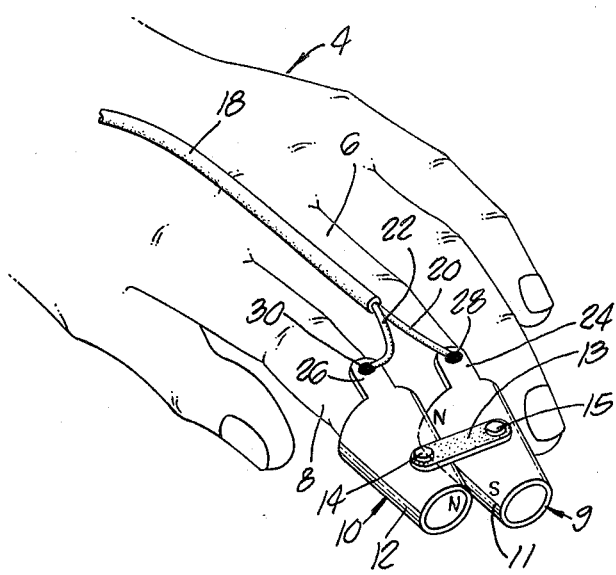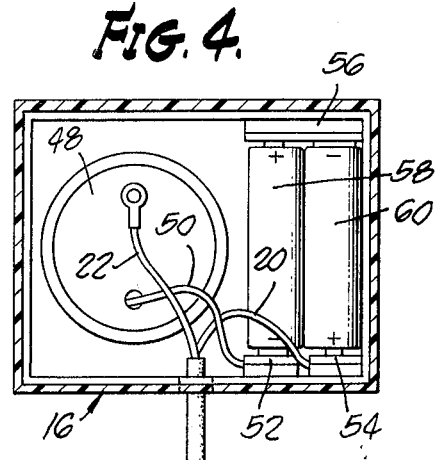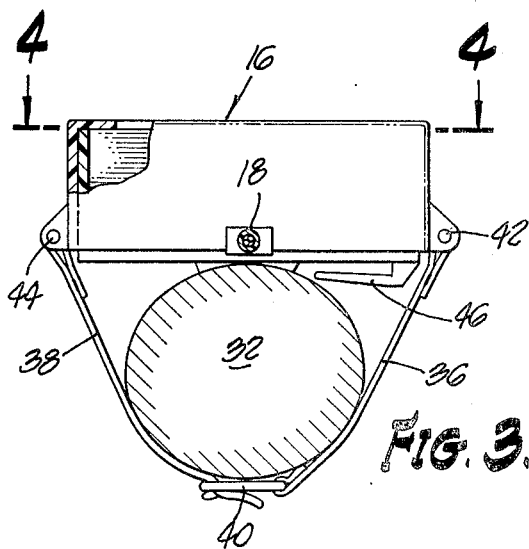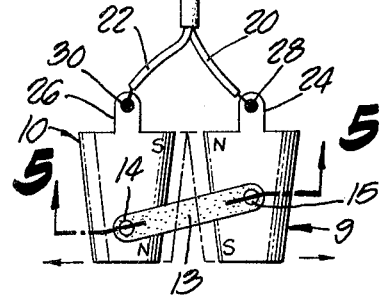

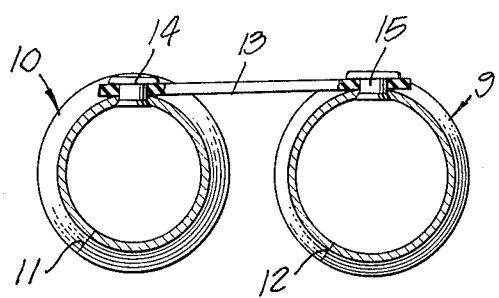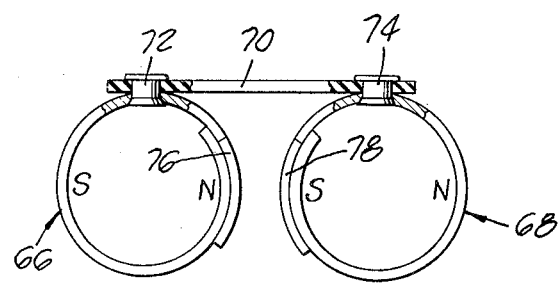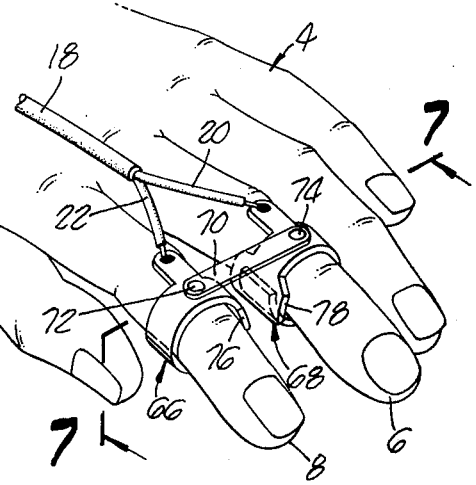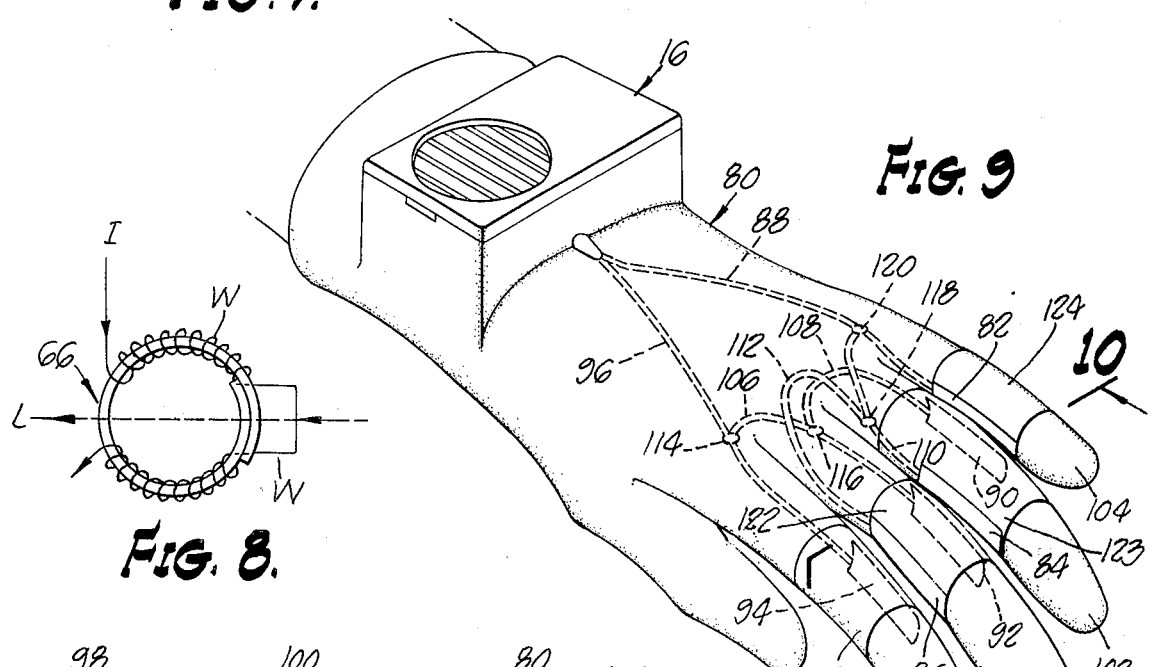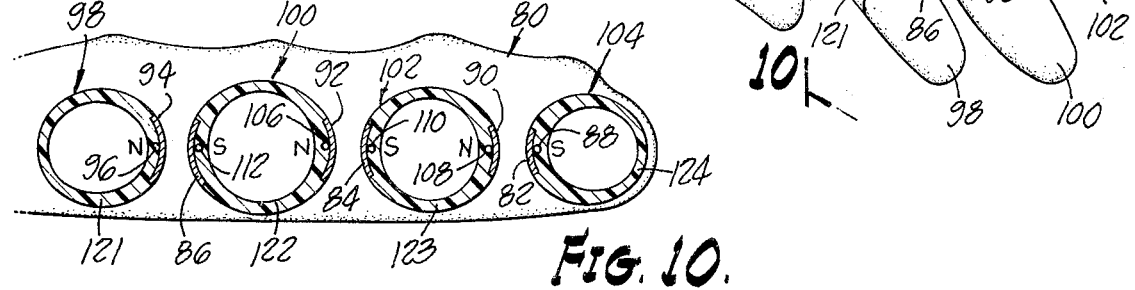

SLEEP ALARM DEVICE

BACKGROUND OF THE INVENTION

The invention relates to a safety device to inhibit sleep by activating an alarm signal or other source of stimulation, in response to the relaxation of the muscles of the hand and fingers, such as occurs in conjunction with increasing drowsiness or sleep.

This invention relates more specifically to an apparatus which is worn on the human hand and which responds to the relaxation of the muscles of the hand and fingers to provide an alarm to warn a wearer of his impending sleep condition.

Such a device has numerous applications where it would be undesirable or unsafe to fall asleep, such as while smoking a cigarette in bed, or while operating an automobile.

The general concept of utilizing some changing physical characteristic brought on by drowsiness or sleep, to warn of impending sleep, is old in the art. By way of example, U.S. Pat. No. 1,881,878 to Nidy, discloses the use of a spring-loaded switch in the pilot's control stick of a plane. When the pilot begins to fall asleep, he relaxes his grip on the control stick. As a result, the spring mechanism closes a circuit which initiates an electric shock to wake up the pilot. As a more recent example of such warning devices is U.S. Pat. No. 3,861,349 to Conley, which discloses an arrangement wherein the driver of an automobile wears a glove to which a rigid or semi-rigid material, such as aluminum or plastic, is adhered. A nail, extending from the material, and pointed in a downward direction, is supposed to penetrate the thigh, thus awakening the driver. Alternatively, nails, which are pointed in the direction of the glove, are supposed to be forced into the glove fabric and awaken the driver if the driver's hand falls from the steering wheel and hits his thigh.

All the prior art warning devices have one or more disadvantages that are overcome in this invention. For example, many of the prior art warning devices are physically integrated within a part of a vehicle being controlled by the user. This integration substantially limits the flexibility of such a device since it becomes virtually impossible or impractical to utilize the warning device in other situations. However, the present invention provides a warning device that is worn by the user and that is readily utilized in a variety of applications, including that of preventing a driver or pilot from falling asleep at his vehicle.

Another disadvantage of the prior art is the unreliability of such devices. By way of example, the concept disclosed by Conley depends upon the premise that the driver of an automobile will drop his hand from the steering wheel onto his thigh when he falls asleep. The lack of reliability of this concept as a warning device, becomes readily apparent when it is realized that there is no assurance that the hand of the driver of an automobile will fall from the steering wheel as the driver falls asleep, and that there is no assurance even if the driver's hand does so fall, that it will land on the thigh of the driver or any other part of his body or that it will land in the proper position to cause the hypothesized pricking of the hand, disclosed by Conley.

SUMMARY OF THE INVENTION

Unlike these unreliable concepts in the prior art, the invention disclosed herein does not depend upon the hand of a driver falling, let alone falling in a particular direction, and it does not depend upon such other improbable events essential in the effectiveness of some prior art devices.

Instead, this invention depends upon a physical occurrence which is universal to normal human beings about to fall asleep, namely, an involuntary relaxation of the muscles throughout the body, and particularly in the hands and fingers.

It will also be observed that unlike many of the prior art alarm devices, the warning device of this invention is comprised of few parts combined in accordance with a simple design that permits low-cost manufacture and generally wide distribution among many smokers, drivers, and others for whom a sleep inhibition device is an important safety measure.

It is therefore an object of this invention to provide a sleep inhibiting device that may be worn by the user and need not be installed into a vehicle or other mechanism being controlled by the user.

It is another object of this invention to provide a sleep inhibiting device that may be used in a variety of applications without modification.

It is another object of this invention to provide a low-cost, simple, and reliable sleep inhibiting device, the successful operation of which is dependent only upon a relaxation of the muscles of the hand and fingers of the user.

BRIEF DESCRIPTION OF THE DRAWINGS

Additional objects, features, and advantages of this invention will be made evident by the following detailed description of the appended drawings in which:

FIG. 1 is an isometric view of one embodiment of the invention shown being worn on the fingers of a human hand in which the muscles are tensed, and also shown being connected to an alarm device;

FIG. 2 is a similar view of part of the same embodiment shown being worn on the fingers of a human hand in which the muscles are relaxed;

FIG. 3 is a cross-sectional view taken along the lines 3—3 in FIG. 1;

FIG. 4 is a top plan view of the embodiment of the invention shown in FIG. 1 and includes a cross-sectional view of the alarm device taken through lines 4—4 in FIG. 3;

FIG. 5 is a cross-sectional view taken along lines 5—5 in FIG. 4;

FIG. 6 is an isometric view of a second embodiment of the invention shown being worn on the fingers of a human hand;

FIG. 7 is a cross-sectional view of the second embodiment of the invention taken along the line 7—7 in FIG. 6;

FIG. 8 is an illustrative view of a ring of the second embodiment of the invention, and indicates a way of magnetizing such a ring;

FIG. 9 is an isometric view of a third embodiment of the invention that includes a glove shown being worn on a human hand; and FIG. 10 is a cross-sectional view of the third embodiment of the invention shown taken along the lines 9—9 in FIG. 9.

DESCRIPTION OF THE PREFERRED EMBODIMENTS

Referring now to FIG. 1, there is shown therein a human hand 4 including middle finger 6 and index finger 8 on which are worn hollow conical frustums 9 and 9 respectively, hereinafter referred to as cones 9 and 10. Cones 9 and 10 may be worn on any two adjacent fingers of the hand and furthermore, more than two such cones may be utilized in this invention.

Cones 9 and 10 comprise switch contact means which, when brought into contact with each other, close a circuit to activate a stimulus device to inhibit sleep of the user. Cones 9 and 10 are made of an electrically conductive material that is sufficiently flexible to be shaped into the cone form with diameter D which increases gradually toward the base of the cone. Diameter D is within a range commensurate with dimensions of human fingers of adult individuals. Typically, diameter D is about ½ inch at the fingertip end of the cone and about one inch at the base end. The length of each cone, measured from fingertip end to base end, is about 1¼ inches. Typically, one cone is placed on an index finger 8 and another cone is placed on the adjacent middle finger 6 and each is then pushed toward the knuckles until the cones are frictionally secured on the respective fingers.

Cones 9 and 10 have seams 11 and 12 respectively. The cones are interconnected by a resilient tension strap 13 that is connected to cone 9 at one end by rivet 15 and to cone 10 at its other end by rivet 14. In addition, the cones have tabs, or lugs, 24 and 26 respectively, each of which includes an eye, or opening, 28 and 30 respectively, permitting easy connection of circuit wires to the cones by soldering to the tabs.

In the embodiment illustrated in FIG. 1, the stimulus device with which this invention is utilized, is shown to be a buzzer assembly 16 that is worn on the wrist adjacent the hand on which the cones are worn. Wires 20 and 22 are connected respectively to cones 9 and 10 by means of solder lugs 24 and 26. The wires are insulated except at their ends that terminate in eyes 28 and 30 respectively. The wires 22 and 20 are routed to the buzzer assembly 16 within wire jacket 18, shown running along the hand and wrist. The interconnection of wires 20 and 22 within the buzzer is best shown in FIG. 4, which is discussed below.

In FIG. 1, the two cones 9 and 10 are shown separated with tension strap 13 extended. In this position there is a gap between the adjacent ends of wires 20 and 22 and the circuit within buzzer assembly 16 remains open, thus preventing the generation of an alarm signal. Tension strap 13, which may be made of a soft, flexible rubber-like material, is connected to cones 9 and 10 so that in the absence of a separating force, the cones will tend to be in contact with each other, as indicated in FIG. 2. To produce the separated condition illustrated in FIG. 1, the wearer must apply a separating force between index finger 8 and middle finger 6, thereby preventing mutual contact of the two cones 8 and 9 and the closing of the circuit in buzzer assembly 16.

Thus, when this invention is worn on the fingers of the human hand, the wearer must consciously apply a separating force between the fingers in which the invention is worn, to prevent the generation of a stimulus signal, such as an audible alarm. When the wearer begins to fall asleep, there is a relaxation of the muscles throughout the body, including those in the hands and fingers. Relaxation of the muscles in the hands and fingers will permit the force exerted by tension strap 13 to overcome the reduced separating force, being applied to those muscles, to pull cones 9 and 10 together until they are in contact, thus completing the circuit formed by cones 9 and 10, wires 20 and 22, and buzzer assembly 16.

As an alternative or additional means of applying an attracting force between cones 9 and 10, that also increases the probability of their contacting each other when the muscles of the hand and fingers are relaxed, cones 9 and 10 may be made of a permanently magnetized material. In order to create the attracting force between the cones, the opposing faces between the cones are magnetized to have opposite polarity. The magnetic poles of the cones 9 and 10 in FIG. 1 are represented by the letters "N" and "S" corresponding to North magnetic pole and South magnetic pole respectively. Thus, each cone is also a dipole magnet with a magnetic field in a direction about parallel to the longitudinal axis of the cone. One cone has its North magnetic pole located at the fingertip end and the adjacent cone has its South magnetic pole located at the fingertip end. Since opposite magnetic poles create an attracting force between them, cones 9 and 10 are attracted to each other by the magnetic field.

When cones 9 and 10 are magnetized to create a magnetic force that attracts the cones to each other, it is still useful to provide a means, such as tension strap 13, to limit the gap between the cone worn on index finger 8 and the cone worn on middle finger 6, to a distance which would provide substantial magnetically-induced attracting force between cones 9 and 10.

As indicated in FIG. 3, buzzer assembly 16 may be worn on the upper side of the wrist 32 and secured thereto by wristband straps 36 and 38 respectively, that are in turn coupled together by clasp 40 on the underside of the wrist. Straps 36 and 38 are secured to the buzzer assembly at pins 42 and 44 respectively, in much the same way a watchband strap may be secured to a watch. The buzzer assembly may also have a pocket clip 46 that permits the user the alternative of wearing the buzzer assembly on a shirt or jacket pocket or lapel.

The circuit of buzzer assembly 16, and the manner in which it is connected to this invention, is best illustrated in FIG. 4. As indicated in FIG. 4, the buzzer assembly 16 includes an electrical buzzer 48 and two dry cell batteries 58 and 60. Insulated wire 20 passes through wire jacket 18 and into the buzzer assembly 16 where it is electrically connected to battery terminal 54.

Insulated wire 22 also passes through the wire jacket 18 and into the buzzer assembly 16 where it is electrically connected to the electrical buzzer 48. A third insulated wire 50 interconnects the battery terminal 52 with a second terminal on the electrical buzzer 48. The two dry cell batteries 58 and 60 are connected in series between battery terminals 54 and 52 by means of battery terminal 56 that is electrically common to both batteries at their juncture.

Of course it will be understood that the invention may employ stimulation means other than buzzer assembly 16 to respond to the novel contacting means that is worn on the fingers of the human hand. Other stimulation means include, for example, vibrators, flashing lights, and devices that can produce mild electrical shocks. In any event, the circuit closure achieved to close a circuit upon the relaxation of the muscles of the hand and fingers that accompanies impending sleep, may be utilized to activate any stimulation means suitable for awakening the user.

FIG. 5 indicates additional details of cones 9 and 10 and also indicates the manner in which the respective ends of tension strap 13 are connected to the cones by means of rivets 14 and 15. It will become readily evident that many other means may be employed for securing the respective ends of tension strap 13 to cones 9 and 10. For example, gluing, or employing a hook and eye configuration, would also suffice to attach the tension strap to the cones.

In FIG. 6 there is shown a second embodiment of this invention in which the cones of the first embodiment are replaced by adjustable rings, each of which has a broad opposing face to increase the likelihood of contact upon the relaxation of the muscles of the fingers and the hand.

As indicated in FIG. 6, adjustable rings 66 and 68 are also interconnected by a tension strap 70, its ends being secured to the respective adjustable rings by rivets 72 and 74. The rings 66 and 68 include broadened portions 76 and 78 respectively. As in the first embodiment, the tension band 70 may be the sole means for providing a mutually attracting force between the contacting members. And as in the first embodiment, the rings 76 and 78, each of which comprises an electrically conductive material, may also be magnetized wherein the opposing faces of the respective rings are oppositely poled to provide magnetically induced attracting forces between the rings.

FIG. 8 indicates one way a ring, such as ring 66, may be permanently magnetized to have opposite poles that are located on a horizontal axis that is about perpendicular to the longitudinal axis of the ring. A wire W is toroidally wound around the ring in one direction above imaginary line L and in the opposite direction below imaginary line L. A direct current I is then passed through wire W, either in the direction indicated in FIG. 8 or in the opposite direction. The resulting magnetized ring 66, will have magnetic poles at the locations indicated in FIG. 7. The actual polarity may be opposite to that shown in FIG. 7 since it will depend upon the direction of the winding of wire W and also on the direction of current I through the wire W.

When magnetized rings are used, tension strap 70 may serve a dual purpose, namely, that of adding an additional attracting force between the magnetized rings and also that of limiting the separation between the rings to assure a minimum magnetic force of sufficient magnitude to cause the rings to come into contact with each other upon relaxation of the muscles of the hand and fingers.

FIG. 7 indicates the manner in which tension strap 70 is connected by means of rivets 72 and 74 to adjustable rings 66 and 68 respectively. Unlike the first embodiment illustrated in FIG. 1, in which adjustability for different finger sizes is provided by means of the shape of cones 9 and 10, the adjustability of the rings indicated in FIG. 6, is provided by means of the overlapping broadened portions 76 and 78. Typically, rings 66 and 68 will be constructed of a material sufficiently flexible to permit easy adjustment of the inner diameter of the rings by simple adjustment of the overlap indicated in cross-section in FIG. 7. Typical materials suitable for rings 66 and 68 include flexible alloys of iron and other flexible magnetic metals.

FIG. 9 illustrates a third embodiment of the invention that employs a glove 80 having electrical contacts in adjacent parts of its "fingers." Glove 80 comprises index finger 98, middle finger 100, ring finger 102, and small finger 104. Although the glove 80 is not as readily adaptable to adjustment for variation in size of the human hand, it does not have the advantage of providing means for mounting the stimulation device, such as buzzer assembly 16, thus making it unnecessary for the user to do anything more than put his hand into the glove.

As in the first two embodiments of the invention discussed above, this third embodiment also employs contacting means that are positioned on adjacent fingers of the human hand and close an electrical circuit when brought into mutual contact as a result of any two adjacent fingers being brought into a contiguous relationship.

The contacting means comprises a first set of metal leaves 82, 84, and 86 that are positioned on glove fingers 104, 102, and 100 respectively, and that are electrically interconnected by means of wires 112, 110, and 88, and a second set of metal leaves 90, 92, and 94 that are positioned on the inside surfaces of glove fingers 102, 100, and 98 respectively and that are interconnected by means of wires 108, 106, and 96. The interconnecting wires are configured within the material comprising glove 80 and are hidden inside the exterior surface of the glove material. The interconnection of the respective wires is accomplished by means such as solder joints 114–120.

Insulated wires 88 and 96 are routed along the wrist portion of the glove where they are connected to the electrical circuit of the buzzer assembly 16. As indicated in FIG. 8, buzzer assembly 16 may be configured to be an integral portion of glove 80.

FIG. 10 is a cross-sectional view of the third embodiment of this invention, and illustrates the respective positions of the metal leaves 82 through 96 and 90 through 94, comprising the contacting means. FIG. 9 also illustrates the positions of the wires that interconnect the metal leaves of each set with each other and with the electrical circuit of buzzer assembly 16.

In the embodiment illustrated in FIG. 9, the mutually attracting force between adjacent fingers of the hand is provided by means of a flexible magnetic material of which portions of the glove fingers are comprised. The magnetic portions of glove fingers 98, 100, 102, and 104 are indicated in FIG. 9 as portions 121, 122, 123, and 124 respectively. The remaining material of which glove 80 is comprised, may be any suitably flexible material, such as rubber or cloth. The opposing surfaces of the portions of the adjacent fingers of the glove that are magnetized, have opposite magnetic poles, as indicated by "N" and "S" in the cross-sectional view of the fingers shown in FIG. 10.

A magnetic flexible material suitable for use in constructing the magnetic portions of glove 80, comprises barium ferrite in powder form and bonded by a synthetic resin or rubber, to form extruded strips or sheets. Such a material has been used commonly as a combination gasket and magnetic closure for refrigerator doors, and is available from numerous manufacturers under such trademarks as "Plastiform", "Plastoferrite", and "Ferriflex".

Typical barium ferrite material bonded into flexible sheets has a flux density in the range of 0.14 to 0.2 weber/meter$^2$, a BH product in the range of 0.3 to 0.8 $\times$ 10$^4$ Joule/meter$^2$, and a magnetizing force in the range of 5.6 to 12.8 $\times$ 10$^4$ Ampere-turns/meter.

Barium ferrite, bonded into flexible sheets, has a resistivity of approximately 10$^{12}$ micro-Ohm centimeters and thus provides a highly insulating material that prevents inadvertent contact of the metal leaves while the glove fingers are separated.

The cones illustrated in FIG. 1, the rings illustrated in FIG. 6, and portions of the fingers of the glove illustrated in FIG. 9, may all be comprised of barium ferrite material. However, if barium ferrite material is used for the rings and the cones of the first two embodiments, it is desirable to cover the contacting means with a metallic material or metallic paint to provide a path of low resistivity between the contiguous rings or cones.

SUMMARY

It is to be understood, therefore, that the invention disclosed is an improved device that is responsive to increasing relaxation of the muscles of the human body as the tendency to sleep increases, to close an electrical circuit and thereby enable a stimulating device, such as an audible alarm, to inhibit sleep.

From the foregoing, it is readily apparent that the sleep inhibiting device of this invention may be utilized also for numerous other purposes, such as automatically turning off lights as one falls asleep, or automatically turning off an appliance, such as a television set, as one falls asleep.

Changes in materials and details of construction and shape of the invention herein described will now become apparent to those of ordinary skill in the art after having reference to the foregoing description and drawings. By way of example, one having ordinary skill in this art will now observe that the switch contact means may take on other forms also suitable for the uses described herein. Furthermore, it will now be understood that the means for producing an attraction force between the switch contacts may be a tension strap, magnetization of the contacts, a combination of both, or some other means. Accordingly, it is not intended that the scope of the invention be limited by the foregoing detailed description, but only by the appended claims.

The invention claimed is:

1. A switching apparatus comprising at least two switch contacts, adapted to be worn on adjacent fingers of a human hand and adapted to close an electrical circuit when brought into mutual contact as a result of said adjacent fingers being brought into a contiguous relationship, each said contact comprising:
   a ring-like device having a face portion for contacting a similar face portion on an adjacent switch contact and adapted to be removably positioned on a human finger and to be retained thereon by frictional engagement with said finger, and
   means urging said face portions toward each other in opposition to muscular forcing of said fingers apart when said devices are on said two fingers.

2. A switching apparatus as defined in claim 1, wherein said ring-like device is in the shape of a hollowed frustum of a cone.

3. A switching apparatus as defined in claim 1, wherein said ring-like device is a cylinder having an adjustable portion whereby the diameter of said cylinder can be varied.

4. A switching apparatus as defined in claim 1, including means for urging said two contacts toward each other.

5. In a sleep-inhibiting apparatus adapted to be worn on the hand of a human being and adapted to be electrically connected to stimulation means that is actuated by the closing of an electrical circuit, an improved switching device comprising:
   switch means including contacts adapted to be worn on adjacent fingers of a human hand with said contacts in opposing positions whereby said contacts close an electrical circuit when brought into mutual contact as a result of any of said adjacent fingers being brought into a contiguous relationship, and
   means physically connected to said switch means and adapted to apply a force between said switch means urging said switch means into contact whereby said electrical circuit is closed and said stimulation means is actuated in response to inadvertent relaxation of muscles of a human hand upon which said switch means are worn.

6. In a sleep inhibiting apparatus as defined in claim 5, said switch means comprising at least two hollow cylinders and said force applying means comprising a resilient strap interconnecting said cylinders.

7. In a sleep inhibiting apparatus as defined in claim 6, each such cylinder being an adjustable ring and adjacent rings being magnetized to have oppositely poled opposing faces.

8. In a sleep inhibiting apparatus as defined in claim 6, each such cylinder comprising a flexible magnetic material, said cylinders being magnetized to have oppositely poled faces on adjacent surfaces.

9. In a sleep inhibiting apparatus as defined in claim 5, said switch means comprising at least two hollowed, cone-shaped elements, each said element having longitudinal length greater than its maximum diameter.

10. In a sleep inhibiting apparatus as defined in claim 5, said switch means comprising a glove having glove fingers and adapted to be worn on the human hand, and said attraction means comprising magnetized material forming at least a part of said fingers of said glove.

11. In a sleep inhibiting apparatus as defined in claim 8, said magnetic material consisting of a powdered ferrite bonded by a synthetic resin to form a flexible sheet.

12. In a sleep inhibiting device as defined in claim 10 wherein said glove further comprises a portion having mounting means adapted for retaining a sound generating device.

13. A sleep responsive switching apparatus comprising:
   support means including at least two switch contacts adapted to be worn on adjacent fingers of a human hand, said two switch contacts being adapted to close an electrical circuit when brought into mutual contact as a result of said adjacent fingers being brought into a contiguous relationship, and
   attraction means integral with said support means and adapted to urge said switch contacts toward each other and to bring said adjacent fingers into electrical contact with each other upon relaxation of the muscles controlling said adjacent fingers.

14. A sleep responsive switching apparatus as defined in claim 13, wherein said attraction means comprises a resilient tension strap connected to said support means.

15. A sleep responsive switching apparatus as defined in claim 13, wherein said switch contacts are magnets that are polarized to be attracted to each other when worn on said adjacent fingers.

16. A sleep responsive switching apparatus comprising:
   support means including at least two switch contacts adapted to be worn on adjacent fingers of a human hand and adapted to close an electrical circuit when brought into mutual contact as a result of said adjacent fingers being brought into a contiguous relationship, and
   means comprising a resilient tension strap connected to said support means for urging said switch contacts towards each other in opposition to muscular forces of said fingers apart when said contacts are worn on said adjacent fingers.

* * * * *